April 30, 1968   R. L. ARNOLD   3,380,592

STRAINER TRAY WITH CENTRAL HANDLE

Filed Aug. 24, 1965

INVENTOR:
ROBERT L. ARNOLD

United States Patent Office 3,380,592
Patented Apr. 30, 1968

3,380,592
STRAINER TRAY WITH CENTRAL HANDLE
Robert Louis Arnold, R.R. 3, Fort William,
Ontario, Canada
Filed Aug. 24, 1965, Ser. No. 482,101
1 Claim. (Cl. 210—244)

ABSTRACT OF THE DISCLOSURE

This specification discloses the combination of a jar having a uniform internal diameter and an open top of the same diameter with a removal tray for the contents of the jar. The tray comprises a flat disc with a diameter slightly less than the interior jar diameter and rests on the jar bottom. A handle in the form of a shaft upstands from the centre of the tray and has a height slightly less than that of the jar interior.

---

This invention relates to an improved food product container such as a pickle jar or the like open mouthed jar or can containing a removal device for such food products.

Modern merchandizing techniques call to an increasing degree for an attractive food packaging, in many cases, of the type which can be used on the table for actually dispensing food without the necessity for turning the food out into a separate dish or bowl. For this purpose, many food products such as preserved fruits, pickles and similar foods are packaged in glass jars having an open mouth of equal diameter to the interior of the jar to permit easy removal with a fork or the like. When packaged in this way, there is commonly a liquid preservative surrounding the food and the food product must be impaled often when it is beneath the surface of such liquid. This difficulty in many cases makes the use of this type of food package somewhat difficult on the table and often leads to accidents in use.

Accordingly, it is an objective of the present invention to provide an improved food package incorporating a removal device whereby the product in the package may be readily lifted out and subsequently removed with the fingers or with a spoon for example, thereby avoiding the difficulties described above.

More particularly, it is an objective of the present invention to provide a removal device for use in association with a food package of predetermined size and dimensions.

More particularly, it is an objective of the present invention to provide a food package incorporating a removal device which may be incorporated with the food at the time of packaging and sealed up and stored for lengthy periods without contaminating the food in the package.

The foregoing and other objectives of the present invention will become apparent from the following description of a preferred embodiment which is given here by way of example only with reference to the following drawings in which like reference devices refer to like parts thereof throughout the various views and diagrams and in which.

Figure 4:
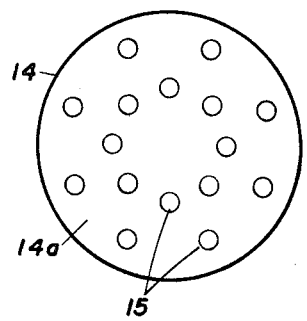
FIGURE 4 is a top plan view of the removal device of FIGURE 3.
Figure 1:
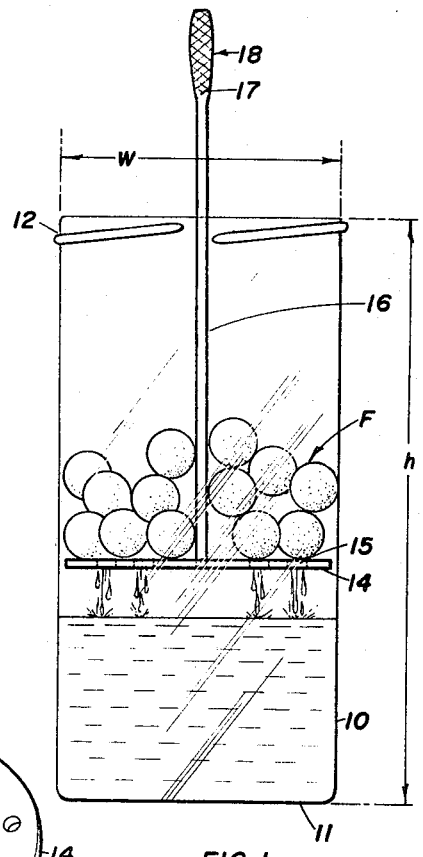
FIGURE 1 is a side elevational view of a food packaging jar from which the lid has been removed showing the removal device partially withdrawn therefrom.
Figure 3:
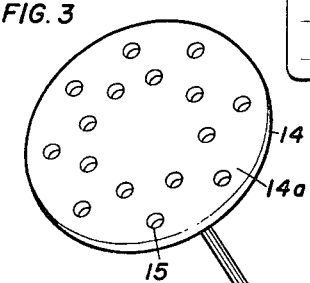
FIGURE 3 is a perspective illustration of the food removal device alone.
Figure 2:
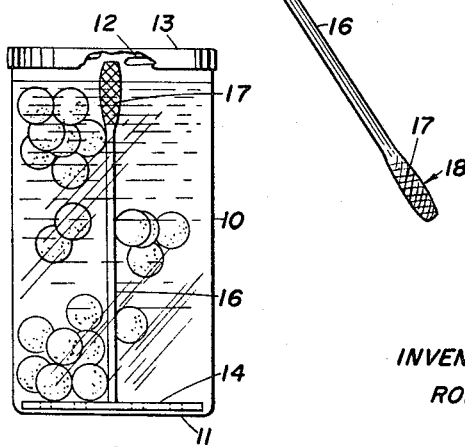
FIGURE 2 is a side elevational view of the food package of FIGURE 1 in its sealed condition showing the removal device in position therein.

From FIGURES 1 and 2 it will be noted that the food package according to the invention comprises a glass jar 10 of generally cylindrical shape having a flat bottom 11 and a threaded neck portion 12 of at least the same diameter as the main portion 10 thereof. A screw threaded closure or lid 13 is provided for sealing the package during shipping and storage, and may be reused after opening to maintain the contents fresh. Food products generally indicated as reference F are contained within the jar 10 surrounded by any suitable preservative liquid.

It will be noted that jar 10 has an overall interior height between the inner surface of bottom 11 and the inner surface of closure 13 indicated as H and an interior diameter indicated as W which is not subject to any restriction throughout the full interior dimension H of the jar 10.

The removal device according to the present invention comprises the flat disc-shaped strainer member 14 having a series of openings 15 therethrough to avoid retention of liquid thereby. Disc-shaped member 14 preferably has a flat undersurface 14a or an undersurface otherwise shaped to conform to the interior of the jar, and an upper surface which is provided with a centrally located upstanding shaft 16 having at its free end a handle member 17 which may be provided with a roughened surface or serrations 18 if desired. The overall dimension from under surface 14a to the top of handle 17 should be slightly less than the dimension H of the interior of the jar 10, and the diameter of the discoid member 14 should be slightly less than the internal width dimension W of the jar 10 thereby to enable insertion of the removal device to the jar prior to filling with food product and to permit sealing of the jar without damage to the handle 17 of the removal device.

The operation of the device is illustrated in FIGURE 1 and requires no explanation.

The construction of the device is preferably a one-piece molding of inert plastic such as polystyrene whereby to avoid migration of undesirable plasticizers or other contaminants into the food products and fluid which might otherwise take place during storage.

The shaping of the discoid member 14 is preferably such as to conform to the interior surface of the bottom of jar 10 thereby occupying as little space as possible and permitting maximum usage of the available space therein.

The foregoing is a description of the preferred embodiment of the invention which is here made by way of example only. The invention is not to be construed as limited to any of the specific features described but comprehends all such variations as come within the spirit and scope of the appended claim.

What I claim is:

1. A food product container adapted for dispensing of individual portions of food therefrom and for storage during intermittent periods of non-usage, said container comprising: a cylindrical jar having an inner uniform diameter terminating in an open mouth of a diameter at least equal to said interior jar diameter, said jar having a bottom presenting an inner flat surface; a closure member for said jar removably positioned over said open mouth; a disc-shaped food removal member having a flat underface resting on said jar bottom and of a diameter slightly less than that of said jar interior; said food removal member being formed with liquid passageways; a handle in the form of a shaft having its lower end connected to said food removal member centrally thereof and having a height slightly less than the height of the jar interior, with the upper end of the handle being flattened to provide grasping means; and portions of solid food products together with a preserving liquid in said jar.

References Cited

UNITED STATES PATENTS

| | | | |
|---|---|---|---|
| 642,262 | 1/1900 | Sarles | 210—359 |
| 2,618,563 | 11/1952 | Barnhard | 99—171 X |
| 2,900,896 | 8/1959 | Bondanini | 210—359 X |
| 2,904,205 | 9/1959 | Callery. | |
| 3,040,897 | 6/1962 | Holman | 210—244 |

FOREIGN PATENTS 519,595   4/1940   Great Britain.

SAMIH N. ZAHARNA, *Primary Examiner.*

REUBEN FRIEDMAN, *Examiner.*

J. ADEE, *Assistant Examiner.*